US011837957B2

(12) United States Patent
Ren et al.

(10) Patent No.: US 11,837,957 B2
(45) Date of Patent: Dec. 5, 2023

(54) AUXILIARY VOLTAGE CONVERSION UNIT FOR SUPPLYING POWER TO A POWER ADAPTER CONTROL CIRCUIT (71) Applicant: Huawei Digital Power Technologies Co., Ltd., Shenzhen (CN)

(72) Inventors: Jie Ren, Shenzhen (CN); Yanjun Hu, Shenzhen (CN); Xue Zhang, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 17/144,323

(22) Filed: Jan. 8, 2021

(65) Prior Publication Data

US 2021/0135575 A1    May 6, 2021

Related U.S. Application Data (63) Continuation of application No. PCT/CN2019/094684, filed on Jul. 4, 2019.

(30) Foreign Application Priority Data

Jul. 9, 2018   (CN) .......................... 201810747396.4

(51) Int. Cl.
*H02M 3/158*  (2006.01)
*H02M 1/08*   (2006.01)
*H02M 1/00*   (2006.01)

(52) U.S. Cl.
CPC ........... *H02M 3/1582* (2013.01); *H02M 1/08* (2013.01); *H02M 1/0009* (2021.05)

(58) Field of Classification Search
CPC .... H02M 3/1582; H02M 3/155; H02M 3/158; H02M 3/335; H02M 1/08; H02M 1/0009; H02M 1/0006; H02M 1/0048; Y02B 70/10
See application file for complete search history.

(56) References Cited

U.S. PATENT DOCUMENTS

2006/0006850 A1    1/2006  Inoue et al.
2008/0304293 A1*  12/2008  Spiridon ............... H02M 3/335
                                            363/21.01
(Continued)

FOREIGN PATENT DOCUMENTS

CN        202143264 U    2/2012
CN        102857108 A    1/2013
(Continued)

OTHER PUBLICATIONS

H. Fan, "Design tips for an efficient non-inverting buck-boost converter", Analog Applications Journal, Texas Instruments, 2014 ( Year: 2014).*

(Continued)

*Primary Examiner* — Kyle J Moody
*Assistant Examiner* — Jye-June Lee
(74) *Attorney, Agent, or Firm* — WOMBLE BOND DICKINSON (US) LLP (57) ABSTRACT A control circuit applied to a power adapter includes a voltage conversion unit and a switch control unit. The voltage conversion unit is configured to: receive a first direct current voltage, and generate a second direct current voltage based on the first direct current voltage, where when the first direct current voltage is lower than a working voltage of the switch control unit, the voltage conversion unit is configured to boost the first direct current voltage, to obtain the second direct current voltage. The switch control unit is configured to: receive the second direct current voltage from the voltage (Continued)

conversion unit, and use the second direct current voltage as a power supply voltage of the switch control unit.

13 Claims, 7 Drawing Sheets

(56) References Cited

U.S. PATENT DOCUMENTS

| | | | |
|---|---|---|---|
| 2010/0156175 | A1 | 6/2010 | Wei |
| 2011/0043172 | A1 | 2/2011 | Dearn |
| 2012/0001610 | A1 | 1/2012 | Klein |
| 2014/0015507 | A1* | 1/2014 | Park .................... G05F 1/46 323/304 |
| 2014/0362615 | A1 | 12/2014 | Takayanagi et al. |
| 2015/0002116 | A1 | 1/2015 | Bernon-Enjalbert et al. |
| 2015/0194875 | A1 | 7/2015 | Jutras |
| 2016/0111962 | A1* | 4/2016 | Mao .................. H02M 3/33507 363/21.16 |
| 2017/0085182 | A1* | 3/2017 | Colbeck ............ H02M 3/33507 |
| 2019/0222138 | A1* | 7/2019 | Strijker ............. H02M 3/33523 |
| 2020/0127575 | A1* | 4/2020 | Liu ...................... H02M 3/156 |
| 2022/0190730 | A1* | 6/2022 | Liu ...................... H02M 3/156 |

FOREIGN PATENT DOCUMENTS

| | | | |
|---|---|---|---|
| CN | 103066872 | A | 4/2013 |
| CN | 103391010 | A | 11/2013 |
| CN | 103857148 | A | 6/2014 |
| CN | 204408206 | U | 6/2015 |
| CN | 205829268 | U | 12/2016 |
| CN | 107742974 | A | 2/2018 |
| CN | 108233708 | A | 6/2018 |
| CN | 109039028 | A | 12/2018 |
| CN | 110417265 | A * | 11/2019 |
| EP | 1926199 | A1 | 5/2008 |
| WO | 2014119040 | A1 | 8/2014 |
| WO | 2017221366 | A1 | 12/2017 |

OTHER PUBLICATIONS

JCC28782 High Density Active Clamp Flyback Controller with EMI Dithering, X-CapDischarge, and Bias Power Management, dated May 2020.total 94 pages.

Linear Technology: "Single Switch PWM Controller with Auxiliary Boost Converter",Dec. 31, 2003 (Dec. 31, 2003), XP055818593, Total 20 Pages.

* cited by examiner

AUXILIARY VOLTAGE CONVERSION UNIT FOR SUPPLYING POWER TO A POWER ADAPTER CONTROL CIRCUIT

CROSS-REFERENCE TO RELATED APPLICATIONS

This application is a continuation of International Patent Application No. PCT/CN2019/094684, filed on Jul. 4, 2019, which claims priority to Chinese Patent Application No. 201810747396.4, filed on Jul. 9, 2018. The disclosures of the aforementioned applications are hereby incorporated by reference in their entireties.

TECHNICAL FIELD

This application relates to the field of electronic circuits, and in particular, to a control circuit applied to a power adapter and a power adapter.

BACKGROUND

A power adapter is applied to a scenario of conversion between a plurality of voltages. The power adapter usually includes a control circuit, and the control circuit is used to control making and breaking of a switch circuit in a primary-side circuit of the power adapter. The control circuit may be, for example, a pulse width modulation (PWM) controller.

With the popularity of the quick charge protocol, more power adapters support wide-range outputs of a plurality of types of power supplies. For example, the quick charge protocol (QCP) supports output voltages from 3.6 V to 12 V, the universal serial bus (USB)-power delivery specification (PDS) supports output voltages from 5 V to 12 V, and the smart charge protocol (SCP) supports output voltages from 3.4 V to 12 V. Because a power supply voltage of the control circuit is usually supplied by an auxiliary power supply, and the auxiliary power supply is usually a flyback power supply, a voltage supplied by the auxiliary power supply is usually in direct proportion to an output voltage of a secondary-side circuit. For a power adapter supporting a wide-range output voltage, the power supply voltage supplied by the auxiliary power supply to the control circuit varies within a range. Therefore, when a voltage output by the power adapter is relatively high, the power supply voltage supplied by the auxiliary power supply to the control circuit is higher than a working voltage needed by the control circuit, leading to an increase in power consumption of the auxiliary power supply, an increase in heat generated by the power adapter, and a decrease in efficiency.

SUMMARY

This application provides a control circuit applied to a power adapter, a power adapter, and a chip, to reduce a power supply loss.

According to a first aspect, a control circuit is provided, and includes a voltage conversion unit and a switch control unit. The voltage conversion unit is configured to: receive a first direct current voltage, and generate a second direct current voltage based on the first direct current voltage, where when the first direct current voltage is lower than a working voltage of the switch control unit, the voltage conversion unit is configured to boost the first direct current voltage, to obtain the second direct current voltage. The switch control unit is configured to: receive the second direct current voltage from the voltage conversion unit, and use the second direct current voltage as a power supply voltage of the switch control unit, where the switch control unit is configured to control making and breaking of a switch circuit in a primary-side circuit of a power adapter.

In an embodiment, the voltage conversion unit is disposed in the control circuit that may be applied to the power adapter, and the voltage conversion unit can boost the received first direct current voltage, and then supply the boosted second direct current voltage to the switch control circuit as the power supply voltage, so that the control circuit can receive a relatively low power supply voltage for power supply, to reduce a power supply loss of the control circuit.

With reference to the first aspect, in an embodiment, when the first direct current voltage is higher than the working voltage of the switch control unit, the voltage conversion unit is further configured to buck the first direct current voltage, to obtain the second direct current voltage.

In an embodiment, the voltage conversion unit is disposed in the control circuit that may be applied to the power adapter, and the voltage conversion unit can further buck the received first direct current voltage, and then supply the bucked second direct current voltage to the switch control circuit as the power supply voltage, to improve power supply efficiency of the control circuit.

With reference to the first aspect, in an embodiment, when the first direct current voltage is higher than the working voltage of the switch control voltage, the switch control unit is further configured to: receive the first direct current voltage, and use the first direct current voltage as the power supply voltage of the switch control unit.

In an embodiment, the voltage conversion unit is disposed in the control circuit that may be applied to the power adapter, and the voltage conversion unit can further directly supply the received first direct current voltage to the switch control circuit as the power supply voltage, to improve power supply flexibility of the control circuit.

With reference to the first aspect, in an embodiment, the voltage conversion unit includes a boost converter or a boost/buck converter.

In an embodiment, the voltage conversion unit may be a boost converter or a boost/buck converter, and is used as a switching-type converter, to reduce power consumption of a circuit.

With reference to the first aspect, in an embodiment, the voltage conversion unit is a boost converter, the voltage conversion unit includes a boost control unit and a first switch circuit, the boost control unit is configured to detect the first direct current voltage, and when the first direct current voltage is lower than the working voltage of the switch control unit, the boost control unit is configured to control making and breaking of the first switch circuit, to boost the first direct current voltage.

With reference to the first aspect, in an embodiment, the voltage conversion unit further includes an inductor, a first diode, and a first output capacitor, where a first terminal of the inductor is configured to receive the first direct current voltage, a second terminal of the inductor, an anode of the first diode, and a first terminal of the first switch circuit are connected, a cathode of the first diode is connected to a positive electrode of the first output capacitor, and a negative electrode of the first output capacitor and a second terminal of the first switch circuit are grounded.

With reference to the first aspect, in an embodiment, the voltage conversion unit is a boost/buck converter, and the voltage conversion unit includes a boost/buck control unit, a first switch circuit, and a second switch circuit, where the boost/buck control unit is configured to detect the first direct current voltage; when the first direct current voltage is lower than the working voltage of the switch control unit, the boost/buck control unit is configured to control making and breaking of the first switch circuit, to boost the first direct current voltage; and when the first direct current voltage is higher than the working voltage of the switch control unit, the boost/buck control unit is further configured to control making and breaking of the second switch circuit, to buck the first direct current voltage.

With reference to the first aspect, in an embodiment, the voltage conversion unit further includes an inductor, a first diode, a second diode, and a first output capacitor, where a first terminal of the second switch circuit is configured to receive the first direct current voltage, a second terminal of the second switch circuit, a first terminal of the inductor, and a cathode of the second diode are connected, a second terminal of the inductor, a first terminal of the first switch circuit, and an anode of the first diode are connected, a cathode of the first diode is connected to an anode of the first output capacitor, and an anode of the second diode, a negative electrode of the first output capacitor, and a second terminal of the first switch circuit are grounded; and when the voltage conversion unit boosts the first direct current voltage, the boost/buck control unit is further configured to control the second switch circuit to be in a conducted state; or when the voltage conversion unit bucks the first direct current voltage, the boost/buck control unit is further configured to control the first switch circuit to be in a cut-off state.

With reference to the first aspect, in an embodiment, the first direct current voltage is an output voltage of an auxiliary power supply in the power adapter, and the auxiliary power supply is configured to: receive energy coupled from the primary-side circuit, and output the first direct current voltage.

In an embodiment, the first direct current voltage may be an output voltage supplied by the auxiliary power supply in the power adapter. Because the voltage conversion unit can boost the received first direct current voltage, and supply the boosted second direct current voltage to the switch control unit, a voltage supplied by the auxiliary power supply to the control circuit is allowed to stay in a relatively small varying range, to reduce a power supply loss of the control circuit, and reduce power consumption of the power adapter.

According to a second aspect, a power adapter is provided, and includes: a transformer, including a primary-side winding and a secondary-side winding; an auxiliary power supply, configured to receive energy coupled from the primary-side winding, to output a first direct current voltage; the control circuit described in the first aspect or any embodiment of the first aspect, where a switch control unit in the control circuit is configured to control turning-on and turning-off of a switch in a primary-side circuit of the power adapter.

In an embodiment, a voltage conversion unit is disposed in the control circuit of the power adapter, and the voltage conversion unit can boost the received first direct current voltage, and then supply the first direct current voltage to a switch control circuit as a power supply voltage, to allow the first direct current voltage supplied by the auxiliary power supply to stay in a relatively small varying range, thereby reducing a power supply loss of the control circuit, and reducing power consumption of the power adapter.

With reference to the second aspect, in an embodiment, the auxiliary power supply includes an auxiliary winding, a second output capacitor, a resistor, and a third diode, where a first terminal of the auxiliary winding is connected to an anode of the third diode, a cathode of the third diode is connected to a first terminal of the resistor, a second terminal of the resistor is connected to a positive electrode of the second output capacitor, a negative electrode of the second output capacitor is connected to a second terminal of the auxiliary winding, and the second terminal of the auxiliary winding and the negative electrode of the second output capacitor are grounded.

According to a third aspect, a chip is provided, and includes the control circuit described in the first aspect or any embodiment of the first aspect.

DESCRIPTION OF EMBODIMENTS

The following describes technical solutions of this application with reference to the accompanying drawings.

For ease of understanding, a power adapter in a related technology is introduced first.

Figure 1:
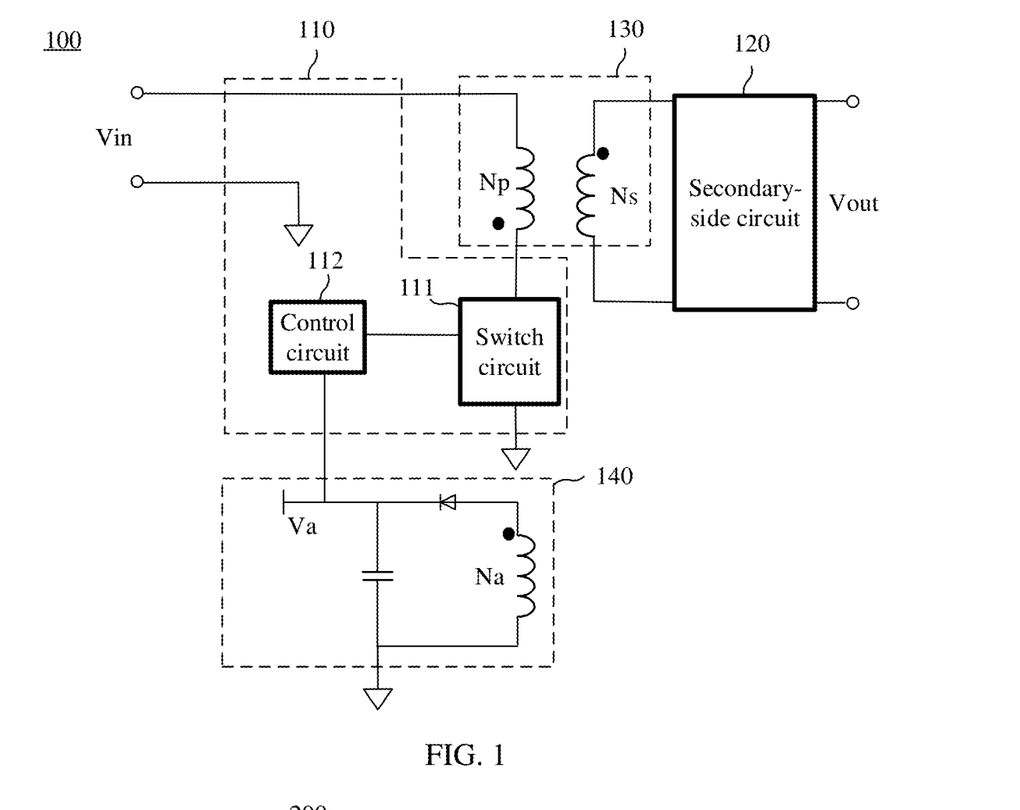
FIG. 1 is a schematic diagram of a power adapter according to an embodiment of this application.

FIG. 1 is a schematic diagram of a circuit structure of a power adapter 100 according to an embodiment of this application. As shown in FIG. 1, the power adapter 100 includes a primary-side circuit 110, a secondary-side circuit 120, a transformer 130, and an auxiliary power supply 140. The transformer 130 includes a primary-side winding Np and a secondary-side winding Ns. The primary-side circuit 110 includes a switch circuit 111 and a control circuit 112. The control circuit 112 is configured to control making and breaking of the switch circuit 111 in the primary-side circuit 110, to couple energy of an input voltage Vin to the secondary-side winding Ns by using the primary-side winding Np. The secondary-side circuit 120 receives, by using the secondary-side winding Ns, the energy coupled from the primary-side circuit 110, to generate an output voltage Vout. The auxiliary power supply 140 is configured to: obtain power from the primary-side winding Np, and supply a generated voltage Va to the control circuit 112 as a power supply voltage of the control circuit 112.

In an embodiment, the primary-side circuit 110 and the secondary-side circuit 120 each may include another one or more function circuits. For example, the primary-side circuit 110 may further include circuits such as a rectifier filter circuit and an electromagnetic interference (EMI) filter protection circuit. The secondary-side circuit 120, for example, may include a protocol control circuit, a synchronous rectification control circuit, or another circuit, and this is not limited in this embodiment of this application.

Because the control circuit 112 needs to drive the switch circuit 111, and the switch circuit 111 usually includes a high-voltage metal-oxide-semiconductor field-effect transistor (MOSFET), the control circuit 112 needs a sufficiently high working voltage to drive the switch circuit. It can be learned from FIG. 1 that because an auxiliary winding Na in the auxiliary power supply 140 is usually a flyback power supply, the voltage Va supplied by the auxiliary power supply 140 is in direct proportion to the output voltage Vout of the secondary-side circuit 120. For example, to drive the switch circuit 111, a working voltage of the control circuit 112 usually needs to stay above 10 V. An example in which a power adapter supports output voltages from 5 V to 20 V is used. When a lowest output voltage 5 V is output, to ensure normal working of the control circuit, a proportion of a quantity of turns of the secondary-side winding Ns to a quantity of turns of the auxiliary winding Na in the auxiliary power supply 140 is at least 1:2. In this case, the output voltage Va of the auxiliary power supply 140 is 10 V. However, when a highest output voltage Vout is 20 V, the output voltage Va of the auxiliary power supply 140 is 40 V. If impact of leakage inductance is considered, the output voltage Va of the auxiliary power supply 140 may be above 60 V in an embodiment.

It is considered that for different power supply voltages, a working current of the control circuit 112 is basically constant. Therefore, when the power supply voltage enables the switch circuit to be driven, a lower power supply voltage of the control circuit 112 indicates a smaller circuit loss. In a related technology, a linear voltage regulator circuit is added to the inside or the outside of the control circuit 112, to regulate a voltage received from the auxiliary power supply, and then, supply a regulated voltage to the control circuit 112 for power supply. Because a higher output voltage of the auxiliary power supply 140 indicates a larger voltage drop of the linear voltage regulator circuit, and a greater loss, heat generated by the power adapter increases, and efficiency decreases. It is assumed that the working current of the control circuit 112 is 5 milliamperes (mA), the proportion of the quantity of turns of the auxiliary winding Na to the quantity of turns of the secondary-side winding Ns is 2:1, and for an application scenario in which an output range of the output voltage Vout is 5 V to 20 V, when the output voltage Vout is 20 V, a theoretical output voltage Va of the auxiliary power supply 140 is 40 V, a power supply loss of the control circuit 112 is 5 mA*40 V=112 mW.

Therefore, for a power adapter having a wide-range output voltage, to ensure that the control circuit can drive the switch circuit 111 in the primary-side circuit at a low output voltage, the proportion of the quantity of turns of the auxiliary winding Na to the quantity of turns of the secondary-side winding Ns needs to be set. However, the setting leads to a result that the power supply loss of the control circuit increases at a high output voltage, causing a waste of power consumption.

In view of the foregoing problem, the embodiments of this application provide a control circuit and a power adapter, to reduce a circuit loss.

Figure 2:
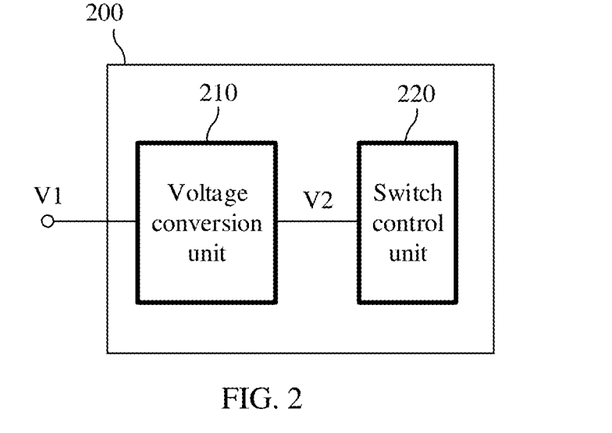
FIG. 2 is a schematic diagram of a control circuit according to an embodiment of this application.

FIG. 2 is a schematic structural diagram of a control circuit 200 according to an embodiment of this application. As shown in FIG. 2, the control circuit 200 includes a voltage conversion unit 210 and a switch control unit 220.

The voltage conversion unit 210 is configured to: receive a first direct current voltage V1, and when the first direct current voltage V1 is lower than a working voltage of the switch control unit 220, boost the first direct current voltage V1, to obtain a second direct current voltage V2.

In an embodiment, the voltage conversion unit 210 may be a switching-type voltage converter. For example, the voltage conversion unit 210 may be a boost converter, or may be a boost/buck converter. The boost/buck converter means that the converter includes both a boost converter and a buck converter.

In an embodiment, the voltage conversion unit may be a boost converter or a boost/buck converter, and is used as a switching-type converter, to reduce power consumption of a circuit.

The switch control unit 220 is configured to: receive the second direct current voltage V2 from the voltage conversion unit 210, and use the second direct current voltage V2 as a power supply voltage of the switch control unit 220, where the switch control unit 220 is configured to control making and breaking of a switch circuit in a primary-side circuit of the power adapter.

In an embodiment, the switch control unit 220 may be, for example, a pulse width modulation (PWM) controller, or a circuit that can implement a function of a PWM controller. The switch control unit 220 controls making and breaking of the switch circuit in the primary-side circuit, to couple energy of an input voltage Vin to a secondary-side winding Np.

In an embodiment, the control circuit 200 may be applied to various types of power adapters or power supplies. For example, the control circuit 200 may be applied to the power adapter 100 in FIG. 1, or may be applied to a power supply or power adapter of another type. The control circuit 200 may replace the control circuit 112 in FIG. 1, and the first direct current voltage V1 may be an output voltage Va of an auxiliary power supply in the power adapter. For example, the first direct current voltage V1 may be an output voltage Va supplied by the auxiliary power supply 140 in FIG. 1. The auxiliary power supply may be a flyback power supply. In other words, the first direct current voltage V1 supplied by the auxiliary power supply is in direct proportion to an output voltage Vout of the power adapter.

In an embodiment, the power adapter may be a power adapter having a wide-range output voltage. For the power adapter having a wide-range output voltage, because the voltage conversion unit 210 included in the control circuit 200 can boost the first direct current voltage V1, the first direct current voltage V1 supplied by the auxiliary power supply does not need to be higher than the working voltage of the switch control unit 220. For example, when the first direct current voltage V1 supplied by the auxiliary power supply is lower than the working voltage of the switch control unit 220, the voltage conversion unit 210 may boost the first direct current voltage V1, to obtain the second direct current voltage V2, and supply the second direct current voltage V2 to the switch control unit 220 for use.

Therefore, a proportion of a quantity of turns of an auxiliary winding Na to a quantity of turns of the secondary-side winding Ns may be set to a relatively small value, for example, 1:1. In this case, when a varying range of the output voltage Vout of the power adapter is relatively large, the auxiliary power supply may supply an output voltage Va having a relatively small varying range to the control circuit, and the control circuit 200 may use the output voltage Va as the first direct current voltage V1, and obtain the second direct current voltage V2 after processing as the power supply voltage, to reduce a power supply loss of the control circuit 200. For example, an example in which the output voltage range is 5 V to 20 V is used, and if the proportion of the quantity of turns of the auxiliary winding Na to the quantity of turns of the secondary-side winding Ns is 1:1, theoretically, a range of the output voltage Va that may be supplied by the auxiliary power supply is 5 V to 20 V, that is, a range of the first direct current voltage V1 is 5 V to 20 V. Therefore, when the control circuit in this embodiment of this application is used, the proportion of the quantity of turns of the auxiliary winding Na to the quantity of turns of the secondary-side winding Ns may be reduced when normal working of the control circuit is ensured, to control the first direct current voltage V1 supplied by the auxiliary power supply to the control circuit to be in a relatively small range, thereby reducing a power supply loss of the control circuit.

In an embodiment, considering a voltage drop of a diode and a circuit loss, a range of the voltage Va that is actually supplied by the auxiliary power supply may be 3 V to 25 V.

In an embodiment, regardless of a range of the output voltage Vout of the power adapter, the output voltage Va supplied by the auxiliary power supply can be kept in a relatively small range by controlling the proportion of the quantity of turns of the auxiliary winding Na to the quantity of turns of the secondary-side winding Ns. For example, if the range of the output voltage Va supplied by the power adapter is 6 V to 30 V, the proportion of the quantity of turns of the auxiliary winding Na to the quantity of turns of the secondary-side winding Ns may be 0.8:1, and the range of the output voltage Va supplied by the auxiliary power supply is 4.8 V to 24 V.

In an embodiment, all or some circuits in the control circuit may be disposed on a same integrated chip. For example, all circuits of the switch control unit 220 and at least some circuits of the voltage conversion unit 210 may be disposed on a same integrated chip. An inductor or a capacitor in the control circuit may be integrated into a chip, or may be disposed in the peripheral of the chip. This is not limited in this embodiment of this application.

In an embodiment, the voltage conversion unit is disposed in the control circuit that may be applied to the power adapter, and the voltage conversion unit can boost the received first direct current voltage V1, and then supply the boosted second direct current voltage V2 to the switch control circuit as the power supply voltage, so that the control circuit can receive a relatively low power supply voltage to supply power, to reduce a power supply loss of the control circuit, or reduce power consumption of the auxiliary power supply.

Further, the first direct current voltage V1 may be the output voltage Va supplied by the auxiliary power supply in the power adapter, to allow the voltage Va supplied by the auxiliary power supply to the control circuit to stay in a relatively small varying range, thereby reducing a power supply loss of the control circuit, or reducing power consumption of the auxiliary power supply, and reducing power consumption of the power adapter.

In an embodiment, the switch control circuit 220 may further include a linear voltage regulator circuit (not shown in the figure). The linear voltage regulator circuit may regulate the second direct current voltage V2, and then supply a regulated voltage to the switch control circuit 220 as the power supply voltage, so that the switch control circuit 220 obtains a stable power supply voltage, to ensure working performance of the switch control circuit 220.

In an embodiment, when the first direct current voltage V1 is higher than the working voltage of the switch control unit 220, the voltage conversion unit 210 is further configured to buck the first direct current voltage V1, to obtain the second direct current voltage V2. In an embodiment, in this case, the voltage conversion unit 210 may be a boost/buck converter.

In an embodiment, the voltage conversion unit is disposed in the control circuit that may be applied to the power adapter, and the voltage conversion unit can further buck the received first direct current voltage, and then supply the bucked second direct current voltage to the switch control circuit as the power supply voltage, to improve power supply efficiency of the control circuit.

In an embodiment, when the first direct current voltage V1 is higher than the working voltage of the switch control unit 220, the voltage conversion unit 210 may not process the first direct current voltage V1, and directly supply the first direct current voltage V1 to the switch control unit 220. In this case, the voltage conversion unit 210 may be a boost converter. In an embodiment, the switch control unit 220 may regulate the first direct current voltage V1 by using the liner voltage regulator, and then use the regulated voltage as the power supply voltage, to ensure working performance of the switch control unit 220.

In an embodiment, the voltage conversion unit is disposed in the control circuit that may be applied to the power adapter, and the voltage conversion unit can further directly supply the received first direct current voltage to the switch control circuit as the power supply voltage, to improve power supply flexibility of the control circuit.

In an embodiment, the switch control unit 220 may include a high-voltage control part and a low-voltage control part. The high-voltage control part needs a relatively high working voltage, and the low-voltage control part needs a relatively low working voltage. For example, the high-voltage control part may be a circuit part used to drive the switch circuit in the primary-side circuit. The low-voltage control part may be the other circuit part of the switch control unit. In an embodiment, the working voltage of the switch control unit 220 may be a working voltage of the high-voltage control part. When the first direct current voltage V1 is lower than the working voltage of the high-voltage control part, the first direct current voltage V1 is boosted, and the obtained second direct current voltage V2 may be used as a power supply voltage of the high-voltage control part. When the first direct current voltage V1 is higher than a working voltage of the low-voltage control part, the first direct current voltage V1 may be directly used as a power supply voltage of the low-voltage control part of the switch control unit 220. Alternatively, in an embodiment, the first direct current voltage V1 may be alternatively directly used as a power supply voltage of a boost control unit or a boost/buck control unit in the voltage conversion unit 210.

In an embodiment, the voltage conversion unit 210 may be further configured to: detect the first direct current voltage V1, to boost the first direct current voltage V1 when the first direct current voltage V1 is lower than the working voltage the switch control unit 220, or to buck the first direct current voltage V1 or directly supply the first direct current voltage V1 to the switch control unit 220 when the first direct current voltage V1 is higher than the switch control unit 220.

It should be noted that the function of detecting the first direct current voltage V1 may be executed by another circuit unit in the control circuit 200, for example, may be executed by the switch control unit 220. This is not limited in this embodiment of this application.

Figure 3:
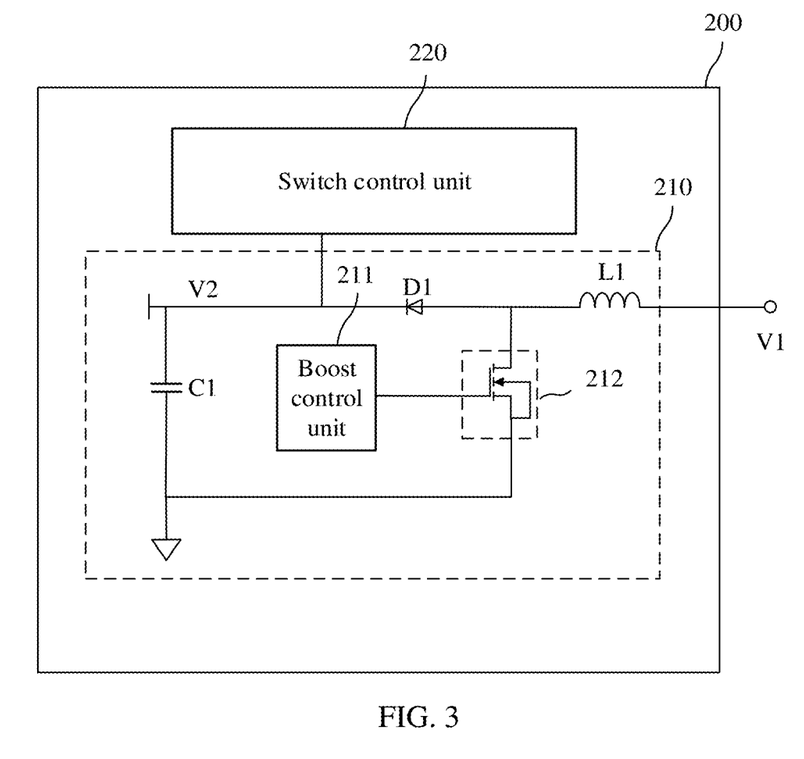
FIG. 3 is a schematic diagram of a control circuit according to another embodiment of this application.

FIG. 3 is a schematic diagram of the control circuit 200 according to an embodiment of this application. The voltage conversion unit 210 in FIG. 3 is a boost converter. As shown in FIG. 3, the voltage conversion unit 210 includes a boost control unit 211 and a first switch circuit 212. The boost control unit 211 is configured to detect the first direct current voltage V1, and when the first direct current voltage V1 is higher than the working voltage of the switch control unit 220, the boost control unit 211 is configured to control making and breaking of the first switch circuit 212, to boost the first direct current voltage V1.

Referring to FIG. 3, the voltage conversion unit 210 further includes an inductor L1, a first diode D1, and a first output capacitor C1. A first terminal of the inductor L1 is configured to receive the first direct current voltage V1, a second terminal of the inductor L1, an anode of the first diode D1, and a first terminal of the first switch circuit 212 are connected, a cathode of the first diode D1 is connected to a positive electrode of the first output capacitor C1, and a negative electrode of the first output capacitor C1 and a second terminal of the first switch circuit 212 are grounded.

All or some circuits of the voltage conversion unit 210 and the switch control unit 220 may be integrated into a same chip. For example, at least one of the inductor L1 and the first output capacitor C1 may be integrated into a chip, or may be disposed in a peripheral circuit, and this is not limited in this application.

Figure 4:
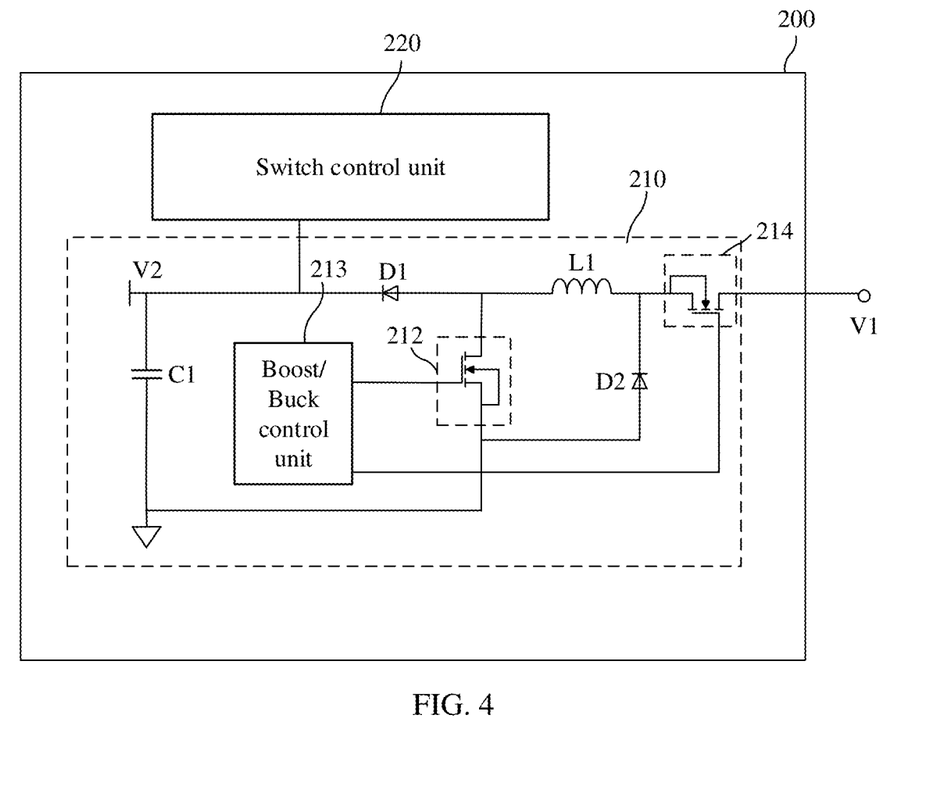
FIG. 4 is a schematic diagram of a control circuit according to another embodiment of this application.

FIG. 4 is a schematic diagram of the control circuit 200 according to another embodiment of this application. The control circuit in FIG. 4 is a boost/buck converter. As shown in FIG. 4, the voltage conversion unit 210 includes a boost/buck control unit 213, a first switch circuit 212, and a second switch circuit 214. The boost/buck control unit 213 is configured to detect the first direct current voltage V1; when the first direct current voltage V1 is lower than the working voltage of the switch control unit 220, the boost/buck control unit 213 is configured to control making and breaking of the first switch circuit 212, to boost the first direct current voltage V1; and when the first direct current voltage V1 is higher than the working voltage of the switch control unit 220, the boost/buck control unit 213 is further configured to control making and breaking of the second switch circuit 214, to buck the first direct current voltage V1.

Referring to FIG. 4, the voltage conversion unit 210 further includes an inductor L1, a first diode D1, a second diode D2, and a first output capacitor C1. A first terminal of the second switch circuit is configured to receive the first direct current voltage V1, a second terminal of the second switch circuit 214, a first terminal of the inductor L1, and a cathode of the second diode D2 are connected, a second terminal of the inductor L1, a first terminal of the first switch circuit 212, and an anode of the first diode D1 are connected, a cathode of the first diode D1 is connected to a positive electrode of the first output capacitor C1, and an anode of the second diode D2, a negative electrode of the first output capacitor C1, and a second terminal of the first switch circuit 212 are grounded.

When the voltage conversion unit 210 boosts the first direct current voltage V1, the boost/buck control unit 213 is further configured to control the second switch circuit 214 to be in a conducted state. In other words, when the second switch circuit 214 is in the conducted state, the inductor L1 receives the first direct current voltage V1, and it may be considered that the second diode D2 and the second switch circuit 214 do not exist. This is equivalent to that a boost function part of the boost/buck converter works, and a buck function part does not work. When the voltage conversion unit 210 bucks the first direct current voltage V1, the boost/buck control unit 213 is further configured to control the first switch circuit 212 to be in a cut-off state. In other words, when the first switch circuit 212 is in the cut-off state, it may be considered that the first switch circuit 212 does not exist. This is equivalent to that the buck function part of the boost/buck converter works, and the boost function part does not work.

It should be noted that because usually, the first direct current voltage V1 is further used to supply power to the boost control unit 211 or the boost/buck control unit 213 in the voltage conversion unit 210, a lowest value of the first direct current voltage V1 needs to enable that the boost control unit 211 or the boost/buck control unit 213 is driven to work normally. For example, when the proportion of the quantity of turns of the auxiliary winding Na to the quantity of turns of the secondary-side winding Ns is configured, it should be noted that a lowest value of the first direct current voltage V1 needs to be higher than a working voltage needed by the boost control unit 211 or the boost/buck control unit 213.

It should be noted that the structures of the control circuits 200 in FIG. 3 and FIG. 4 are merely examples, and a person skilled in the art may make equivalent or similar designs or variations based on the example in FIG. 3 or FIG. 4, and the designs or variations still fall within the protection scope of this application provided that they implement a same function. For example, the voltage conversion unit in the control circuit may be a boost converter or a boost/buck converter in any form.

Figure 5:
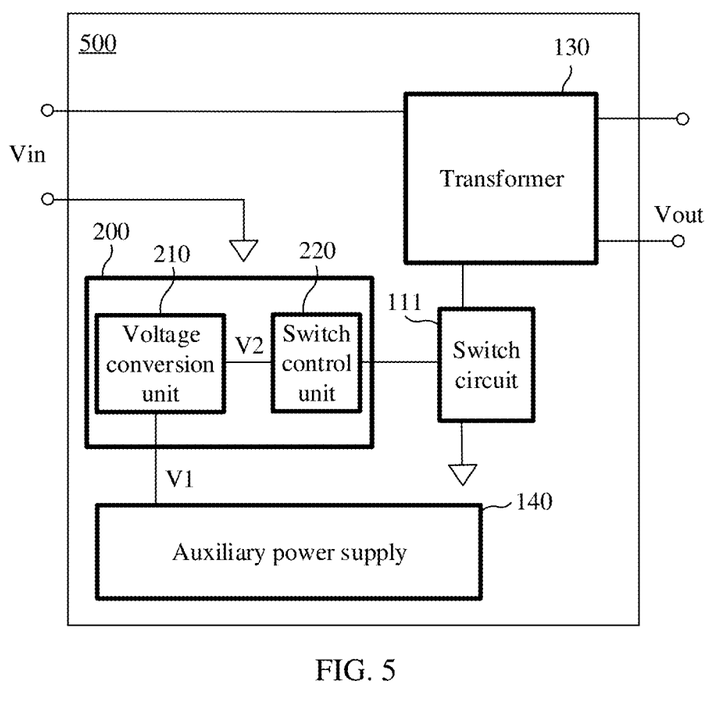
FIG. 5 is a schematic diagram of a power adapter according to another embodiment of this application.

The foregoing describes the control circuit in the embodiments of this application, and the following describes a power adapter 500 in the embodiments of this application. As shown in FIG. 5, the power adapter 500 includes:
- a transformer 130, including a primary-side winding Np and a secondary-side winding Ns;
- an auxiliary power supply 140, configured to receive energy coupled from the primary-side winding Np, to output a first direct current voltage V1; and
- a control circuit 200, where the control circuit 200 includes a voltage conversion unit 210 and a switch control unit 220.

The voltage conversion unit 210 is configured to: receive the first direct current voltage V1, and generate a second direct current voltage V2 based on the first direct current voltage V1, where when the first direct current voltage V1 is lower than a working voltage of the switch control unit 220, the voltage conversion unit 210 is configured to boost the first direct current voltage V1, to obtain the second direct current voltage V2. The switch control unit 220 is configured to: receive the second direct current voltage V2 from the voltage conversion unit 210, and use the second direct current voltage V2 as a power supply voltage of the switch control unit 220, where the switch control unit 220 is configured to control making and breaking of a switch circuit 111 in a primary-side circuit of the power adapter.

The control circuit 200 may be the control circuit described in any example in FIG. 2 to FIG. 4. For brevity, a part, the same as or similar to that in the foregoing specification, in the example in FIG. 5 is not described herein again.

In an embodiment, the power adapter further includes a primary-side circuit and a secondary-side circuit. The primary-side circuit and the secondary-side circuit each may include another one or more function circuits. For example, the primary-side circuit may further include circuits such as a rectifier filter circuit and an electromagnetic interference (EMI) filter protection circuit. The secondary-side circuit, for example, may include a protocol control circuit, a synchronous rectification control circuit, or another circuit, and this is not limited in this embodiment of this application.

In an embodiment, the voltage conversion unit is disposed in the control circuit of the power adapter, and the voltage conversion unit can boost the received first direct current voltage V1, and then supply the first direct current voltage V1 to the switch control circuit as the power supply voltage, to allow the first direct current voltage V1 supplied by the auxiliary power supply to stay in a relatively small varying range, thereby reducing a power supply loss of the control circuit, or reducing power consumption of the auxiliary power supply, and reducing power consumption of the power adapter.

In an embodiment, because the voltage conversion unit is disposed in the control circuit of the power adapter, all or some circuits of the voltage conversion unit, and the switch control unit may be integrated into a same chip. An inductor and a capacitor in the voltage conversion unit may be integrated into a chip or disposed in a peripheral circuit. In addition, compared with the prior art, according to the control circuit in this embodiment of this application, components such as the capacitor and the inductor disposed in the peripheral circuit of the chip can be reduced. Therefore, when the control circuit in this embodiment of this application is used, a quantity of components can be reduced, and an occupation area of a printed circuit board can be reduced.

Figure 6:
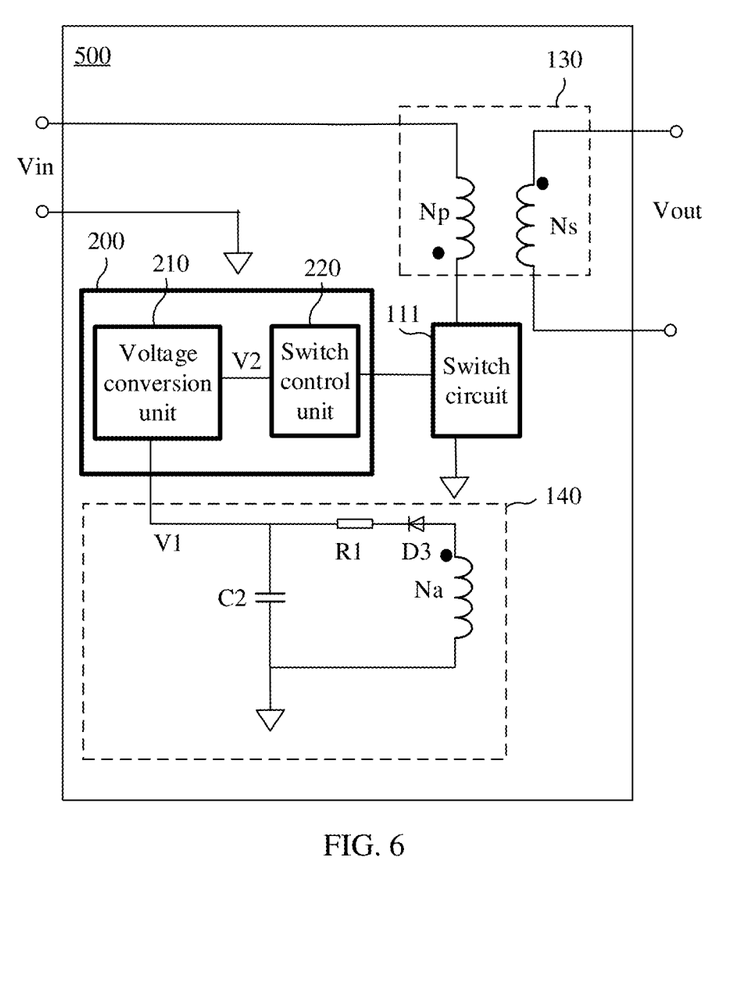
FIG. 6 is a schematic diagram of a power adapter according to another embodiment of this application.

FIG. 6 is a schematic diagram of the power adapter 500 according to another embodiment of this application. As shown in FIG. 6, the auxiliary power supply 140 may include an auxiliary winding Na, a second output capacitor C2, a resistor R1, and a third diode D3. A first terminal of the auxiliary winding Na is connected to an anode of the third diode D3, a cathode of the third diode D3 is connected to a first terminal of the resistor R1, a second terminal of the resistor R1 is connected to a positive electrode of the second output capacitor C2, a negative electrode of the second output capacitor C2 is connected to a second terminal of the auxiliary winding Na, and the second terminal of the auxiliary winding Na and the negative electrode of the second output capacitor C2 are grounded.

The output capacitor C2 is configured to output the first direct current voltage V1.

It should be noted that the structure of the auxiliary power supply 140 in FIG. 6 is merely an example, and a person skilled in the art may make equivalent or similar designs or variations based on the example in FIG. 6, and the designs or variations still fall within the protection scope of this application provided that they implement a same function. For example, the auxiliary power supply 140 may be an auxiliary power supply in any form provided that the voltage conversion circuit can supply the power supply voltage to the control circuit.

Figure 7:
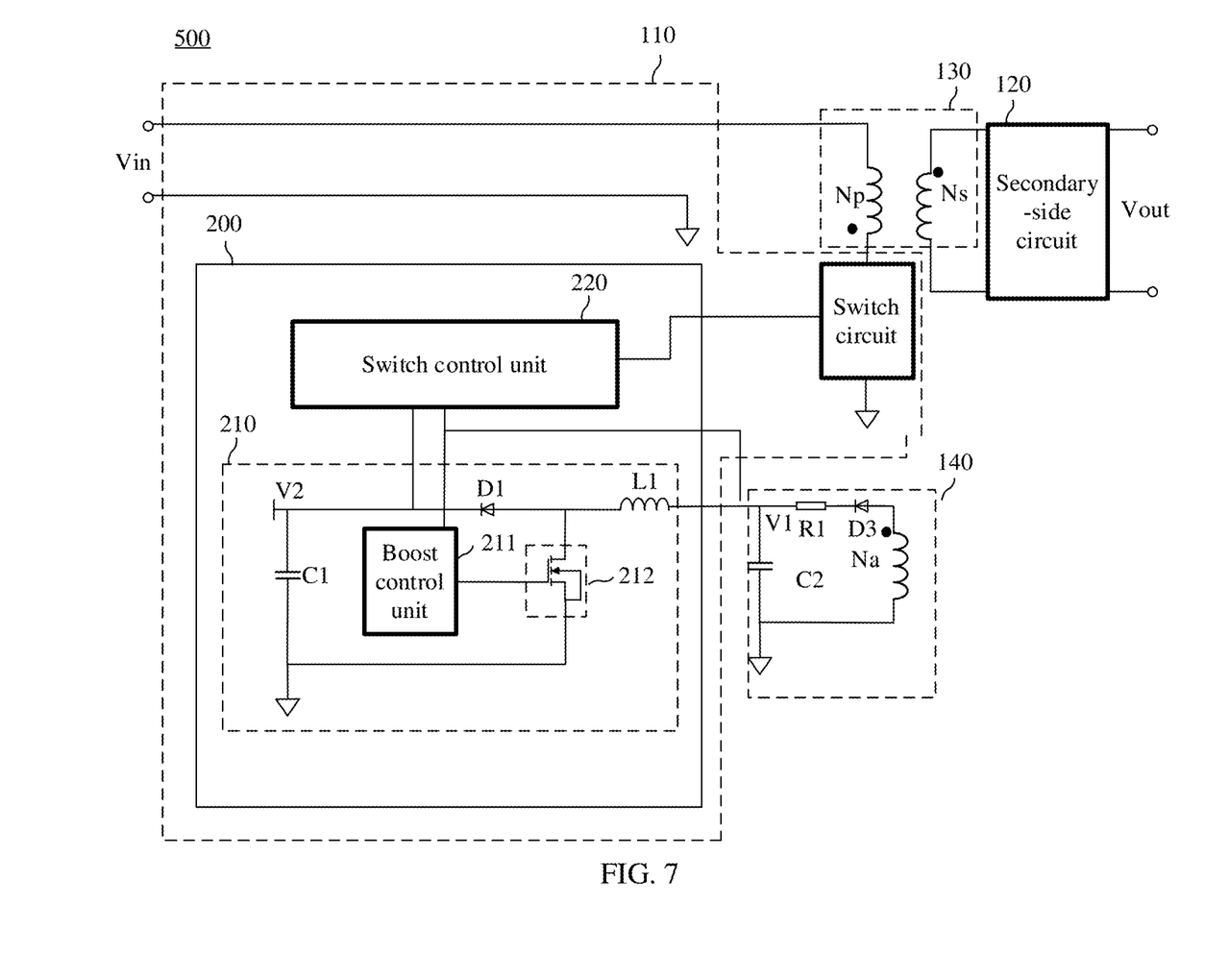
FIG. 7 is a schematic diagram of a power adapter according to another embodiment of this application.

FIG. 7 is a schematic diagram of the power adapter 500 according to another embodiment of this application. The voltage conversion unit 210 in FIG. 7 is a boost converter. As shown in FIG. 7, the power adapter 500 includes a primary-side circuit 110, a secondary-side circuit 120, a transformer 130, and an auxiliary power supply 140. The transformer 130 includes a primary-side winding Np and a secondary-side winding Ns. The auxiliary power supply 140 includes an auxiliary winding Na. The primary-side circuit 110 includes a switch circuit 111 and a control circuit 200. The control circuit 200 includes a voltage conversion unit 210 and a switch control unit 220. The switch control unit 220 in the control circuit 200 is configured to control making and breaking of the switch circuit 111 in the primary-side circuit. The voltage conversion unit 210 includes a boost control unit 211, a first switch circuit 212, an inductor L1, a first diode D1, and a first output capacitor C1.

The auxiliary winding Na receives a voltage coupled from the primary-side winding Np, and the voltage is converted into a direct current after being rectified by the third diode D3. The boost control unit 211 may set an output voltage to a constant value, and the constant value is greater than or equal to the working voltage of the switch control circuit. For example, it is assumed that the constant value is 10 V. When the first direct current voltage V1 is lower than 10 V, the boost control unit works to boost the first direct current voltage V1 to obtain the second direct current voltage V2. The second direct current voltage V2 is the constant value 10 V. The first direct current voltage V1 is a voltage on the second output capacitor C2. The second direct current voltage V2 is a voltage on the first output capacitor C1. When the first direct current voltage V1 is greater than 10 V, the boost control unit 211 does not work, and the first direct current voltage V1 may be directly supplied to the switch control unit 220 as the power supply voltage. Alternatively, the boost control unit 211 does not work, and after passing through the inductor L1 and the first diode D1, the first direct current voltage V1 is transmitted to the switch control unit 220 as the power supply voltage.

In an embodiment, the first direct current voltage V1 may connect the switch control unit 220 and the boost control unit 211. The switch control unit 220 may be configured to: detect the first direct current voltage V1 on the second output capacitor C2, and control turning-on and turning-off of the boost control unit 211 based on a detection result. In other words, when it is detected that the first direct current voltage V1 is higher than the working voltage of the switch control unit 220, the boost control unit 211 is turned off, and boosting processing is not performed. If it is detected that the first direct current voltage V1 is lower than the working voltage of the switch control unit 220, the boost control unit 211 is turned on, and performs boosting processing.

In an embodiment, the first direct current voltage V1 may directly supply power to the low-voltage control part of the switch control unit 220 or supply power to the boost control unit after being regulated by a linear voltage regulator (not shown in the figure).

In a specific example, it is assumed that a proportion of a quantity of turns of the auxiliary winding Na to a quantity of turns of the secondary-side winding Ns is Na:Ns=1:1, and a voltage drop of a diode is ignored. When an output voltage Vout of the power adapter 500 is 20 V, a theoretical value of the first direct current voltage V1 output by the auxiliary power supply 140 is 20 V in this case. Considering impact of leakage inductance, an actual value of the first direct current voltage V1 is approximately 25 V. When the output voltage Vout of the power adapter 500 is 5 V, a theoretical voltage of the first direct current voltage V1 output by the auxiliary power supply 140 is 5 V. Considering a voltage drop of the diode and a circuit loss, the actual value of the first direct current voltage V1 may be as low as 3 V. Therefore, when a range of the output voltage of the power adapter is 5 V to 20 V, an ideal range of an input voltage (namely, the first direct current voltage V1) of the voltage conversion unit 210 is 5 V to 20 V, and an actual range is approximately 3 V to 25 V. For another output voltage range of the power adapter 500, if a proportion of a highest output voltage to a lowest output voltage approaches 4:1, the range of the first direct current voltage V1 output by the auxiliary power supply 140 may also be controlled to be 3 V to 25 V by adjusting the proportion of the quantities of turns. Certainly, if the voltage proportion of the highest output voltage to the lowest output voltage of the power adapter 500 is another proportion, the range of the first direct current voltage V1 output by the auxiliary power supply 140 may be controlled to be an appropriate range by adjusting the proportion of the quantity of turns of the auxiliary winding Na to the quantity of turns of the secondary-side winding Ns. For example, compared with the solution in FIG. 1, it is also assumed that a working current of the switch control circuit 220 is 5 mA, and a loss of the voltage conversion circuit is ignored. Theoretically, a maximum loss of power supply of the auxiliary power supply 140 is 5*20=100 mW. Compared with the solution in FIG. 1, a 100 mW loss is saved.

In an embodiment, the primary-side circuit 110 and the secondary-side circuit 120 each may include another one or more function circuits. For example, the primary-side circuit 110 may further include circuits such as a rectifier filter circuit and an electromagnetic interference (EMI) filter protection circuit. The secondary-side circuit 120, for example, may include a protocol control circuit, a synchronous rectification control circuit, or another circuit, and this is not limited in this embodiment of this application.

In an embodiment, the inductor L1 and the first output capacitor C1 in FIG. 7 may be integrated into a chip, or may be disposed in a peripheral circuit, and this is not limited in this embodiment of this application. Compared with the prior art, in the solution of this embodiment of this application, components such as the capacitor and the inductor disposed in the peripheral circuit can be reduced, to simplify the circuit, and reduce an occupation area of a printed circuit board (PCB), thereby reducing a size of the power adapter.

In an embodiment, when the power adapter supports a wide-range output voltage, in this embodiment of this application, the voltage conversion unit is added to the control circuit in the primary-side circuit, so that the power supply voltage on the control circuit stays in a relatively small range, and a peripheral component can be simplified to the greatest extent. When the solution is used, a circuit loss can be reduced, and an occupation area of a circuit can be reduced.

Figure 8:
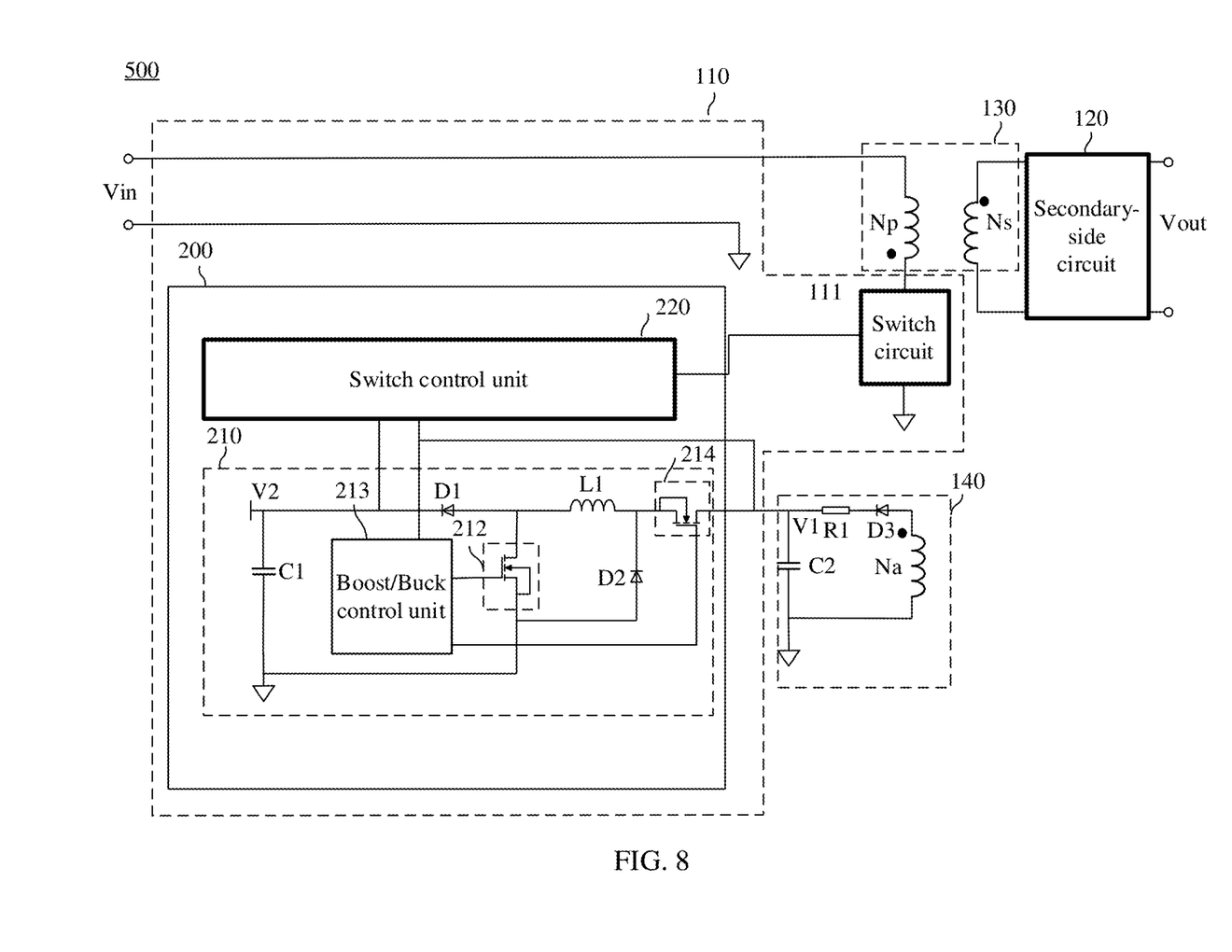
FIG. 8 is a schematic diagram of a power adapter according to another embodiment of this application.

FIG. 8 is a schematic diagram of the power adapter 500 according to another embodiment of this application. The voltage conversion unit 210 in FIG. 8 is a boost/buck converter. As shown in FIG. 8, the power adapter includes a primary-side circuit 110, a secondary-side circuit 120, a transformer 130, and an auxiliary power supply 140. The transformer 130 includes a primary-side winding Np and a secondary-side winding Ns. The auxiliary power supply 140 includes an auxiliary winding Na. The primary-side circuit 110 includes a switch circuit 111 and a control circuit 200. The control circuit 200 includes a voltage conversion unit 210 and a switch control unit 220. The switch control unit 220 in the control circuit 200 is configured to control making and breaking of the switch circuit 111 in the primary-side circuit 110. The voltage conversion unit 210 includes a boost/buck control unit 213, a first switch circuit 212, a second switch circuit 214, an inductor L1, a first diode D1, a second diode D2, and a first output capacitor C1. A first terminal of the second switch circuit 214 is configured to receive the first direct current voltage V1, a second terminal of the second switch circuit 214, a first terminal of the inductor L1, and a cathode of the second diode D2 are connected, a second terminal of the inductor L1, a first terminal of the first switch circuit 212, and an anode of the first diode D1 are connected, a cathode of the first diode D1 is connected to a positive electrode of the first output capacitor C1, and an anode of the second diode D2 and a negative electrode of the first output capacitor C1, and a second terminal of the first switch circuit 212 are grounded. When the voltage conversion unit 210 boosts the first direct current voltage V1, the boost/buck control unit 213 is further configured to control the second switch circuit 214 to be in a conducted state. When the voltage conversion unit 210 bucks the first direct current voltage V1, the boost/buck control unit 213 is further configured to control the first switch circuit 212 to be in a cut-off state.

The auxiliary winding Na receives a voltage coupled from the primary-side winding Ns, and the voltage is converted into the first direct current voltage V1 after being rectified by the third diode D3. The boost/buck control unit 213 may set an output voltage of the boost/buck control unit 213 to a constant value, and the constant value is greater than or equal to the working voltage of the switch control circuit. For example, it is assumed that the constant value is 10 V. When the first direct current voltage V1 is lower than 10 V, the second diode D2 stays in the cut-off state, and the second switch circuit 214 stays in the conducted state. The boost control part of the voltage conversion unit 210 works, to boost the first direct current voltage V1, to obtain the second direct current voltage V2. In other words, the first switch circuit 212, the inductor L1, and the first diode D1 work. The second direct current voltage V2 is the constant value 10 V. The first direct current voltage V1 is a voltage on the second output capacitor C2. The second direct current voltage V2 is a voltage on the first output capacitor C1. When the first direct current voltage V1 is higher than 10 V, the first switch circuit 212 stays in the cut-off state, and a first switch transistor D1 stays in the conducted state. The buck control part of the voltage conversion unit 210 works, to buck the first direct current voltage V1, to obtain the second direct current voltage V2. In other words, the second switch circuit 214, the inductor L1, and the second diode D2 work.

In an embodiment, the first direct current voltage V1 may connect the switch control unit 220 and the boost/buck control unit 213. The switch control unit 220 may be configured to: detect the first direct current voltage V1 on the second output capacitor C2, and control switching of the boost/buck control unit 213 based on a detection result. In other words, when it is detected that the first direct current voltage V1 is higher than the working voltage of the switch control unit 220, the buck control part of the voltage conversion unit 210 is enabled, to perform bucking processing. If it is detected that the first direct current voltage V1 is lower than the working voltage of the switch control unit 220, the boost control part of the voltage conversion unit 210 is enabled, to perform boosting processing.

In an embodiment, the first direct current voltage V1 may directly supply power to the low-voltage control part of the switch control unit 220 or supply power to the boost/buck control unit 213 of the voltage conversion unit 210 after linear voltage regulation processing is performed on the first direct current voltage V1.

In an embodiment, it is assumed that the proportion of the quantity of turns of the auxiliary winding Na to the quantity of turns of the secondary-side winding Ns is Na:Ns=1:1, and a voltage drop of a diode is ignored. When the output voltage Vout of the power adapter 500 is 20 V, a theoretical value of the first direct current voltage V1 output by the auxiliary power supply 140 is 20 V in this case. Considering impact of leakage inductance, an actual value of the first direct current voltage V1 is approximately 25 V. When the output voltage Vout of the power adapter 500 is 5 V, a theoretical voltage of the first direct current voltage V1 output by the auxiliary power supply 140 is 5 V. Considering a voltage drop of the diode and a circuit loss, the actual value of the first direct current voltage V1 may be as low as 3 V. Therefore, when a range of the output voltage of the power adapter is 5 V to 20 V, an ideal range of an input voltage (namely, the first direct current voltage V1) of the voltage conversion unit 210 is 5 V to 20 V, and an actual range is approximately 3 V to 25 V. For another output voltage range of the power adapter 500, if a proportion of a highest output voltage to a lowest output voltage approaches 4:1, the range of the first direct current voltage V1 output by the auxiliary power supply 140 may also be controlled to be 3 V to 25 V by adjusting the proportion of the quantities of turns. Certainly, if the voltage proportion of the highest output voltage to the lowest output voltage of the power adapter 500 is another proportion, the range of the first direct current voltage V1 output by the auxiliary power supply 140 may be controlled to be an appropriate range by adjusting the proportion of the quantity of turns of the auxiliary winding Na to the quantity of turns of the secondary-side winding Ns. For example, compared with the solution in FIG. 1, it is also assumed that a working current of the switch control circuit 220 is 5 mA, and a loss of the voltage conversion circuit is ignored. Theoretically, a maximum loss of power supply of the auxiliary power supply 140 is 5*20=100 mW. Compared with the solution in FIG. 1, a 100 mW loss is saved.

In an embodiment, the primary-side circuit 110 and the secondary-side circuit 120 each may include another one or more function circuits. For example, the primary-side circuit 110 may further include circuits such as a rectifier filter circuit and an electromagnetic interference (EMI) filter protection circuit. The secondary-side circuit 120, for example, may include a protocol control circuit, a synchronous rectification control circuit, or another circuit, and this is not limited in this embodiment of this application.

In an embodiment, the inductor L1 and the first output capacitor C1 in FIG. 8 may be integrated into a chip, or may be disposed in a peripheral circuit, and this is not limited in this embodiment of this application. Compared with the prior art, in the solution of this embodiment of this application, components such as the capacitor and the inductor needing to be disposed in the peripheral circuit can be reduced, to simplify the circuit, and reduce an occupation area of a PCB board, thereby reducing a size of the power adapter.

In this embodiment of this application, when the power adapter supports a wide-range output voltage, in this embodiment of this application, the voltage conversion unit is added to the control circuit in the primary-side circuit, so that the power supply voltage on the control circuit stays in a relatively small range, and a peripheral component can be simplified to the greatest extent. When the solution is used, a circuit loss can be reduced, and an occupation area of a circuit can be reduced.

A person of ordinary skill in the art may be aware that units and algorithm operations in examples described with reference to the embodiments disclosed in this specification may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control circuit comprising:
a voltage conversion unit to receive a first direct current voltage, and generate a second direct current voltage based on the first direct current voltage, wherein the voltage conversion unit comprises a boost converter or a boost/buck converter; and
a switch control unit to receive the second direct current voltage from the voltage conversion unit, and use the second direct current voltage as a power supply voltage of the switch control unit, wherein
when the first direct current voltage is lower than a working voltage of the switch control unit, the voltage conversion unit is configured to boost the first direct current voltage to obtain the second direct current voltage, and the switch control unit is configured to control making and breaking of a switch circuit in a primary-side circuit of a power adapter, wherein the first direct current voltage is an output voltage of an auxiliary power supply in the power adapter, and the auxiliary power supply is configured to: receive energy coupled from the primary-side circuit, and output the first direct current voltage, the first direct current voltage supplied by the auxiliary power supply is in direct proportion to an output voltage of the power adapter, wherein the first direct current voltage is greater than 15 volts and less than 25 volts, wherein the voltage conversion unit further comprises a first switch circuit, an inductor, a first diode, and a first output capacitor, and wherein a first terminal of the inductor is configured to receive the first direct current voltage, a second terminal of the inductor, an anode of the first diode, and a first terminal of the first switch circuit are connected, a cathode of the first diode is connected to a positive electrode of the first output capacitor, and a negative electrode of the first output capacitor and a second terminal of the first switch circuit are grounded, wherein the voltage conversion unit further comprises a boost control unit or a boost/buck control unit, the boost control unit or the boost/buck control unit is configured to detect the first direct current voltage and control making and breaking of the first switch circuit;

wherein the first switch circuit, the inductor and the first diode works to boost the first direct current voltage to obtain the second direct current voltage when the first direct current voltage is lower than the working voltage of the switch control unit, and the first switch circuit stays in a cut-off state to buck the first direct current voltage or directly supply the first direct current voltage to the switch control unit when the first direct current voltage is higher than the working voltage of the switch control unit, wherein the switch control unit is further configured to receive the first direct current voltage directly for detection, and control turning-on and turning-off of the boost control unit or the boost/buck control unit based on a detection result of the first direct current voltage.

2. The control circuit according to claim 1, wherein the voltage conversion unit comprises the boost control unit and when the first direct current voltage is lower than the working voltage of the switch control unit, the boost control unit is configured to control making and breaking of the first switch circuit, to boost the first direct current voltage.

3. The control circuit according to claim 1, wherein the voltage conversion unit comprises the boost/buck control unit, and a second switch circuit, wherein when the first direct current voltage is lower than the working voltage of the switch control unit, the boost/buck control unit is configured to control making and breaking of the first switch circuit, to boost the first direct current voltage; and when the first direct current voltage is higher than the working voltage of the switch control unit, the boost/buck control unit is further configured to control making and breaking of the second switch circuit, to buck the first direct current voltage.

4. The control circuit according to claim 3, wherein the voltage conversion unit further comprises a second diode, and wherein a first terminal of the second switch circuit is configured to receive the first direct current voltage, a second terminal of the second switch circuit, a first terminal of the inductor, and a cathode of the second diode are connected, a second terminal of the inductor, a first terminal of the first switch circuit, and an anode of the first diode are connected, a cathode of the first diode is connected to an anode of the first output capacitor, and an anode of the second diode, a negative electrode of the first output capacitor, and a second terminal of the first switch circuit are grounded; and when the voltage conversion unit boosts the first direct current voltage, the boost/buck control unit is further configured to control the second switch circuit to be in a conducted state; or when the voltage conversion unit bucks the first direct current voltage, the boost/buck control unit is further configured to control the second switch circuit to be in a cut-off state.

5. The control circuit according to claim 1, wherein the first direct current voltage directly supplies power to a low-voltage side of the switch control unit to power the switch control unit.

6. The control circuit according to claim 1, wherein the inductor, the first diode, and the first output capacitor are integrated into a same integrated chip as the control circuit.

7. A power adapter, comprising:

a transformer, comprising a primary-side winding and a secondary-side winding;

an auxiliary power supply, configured to receive energy coupled from the primary-side winding, to output a first direct current voltage; and a control circuit comprising:

a voltage conversion unit configured to receive the first direct current voltage, and generate a second direct current voltage based on the first direct current voltage, wherein the voltage conversion unit comprises a boost converter or a boost/buck converter; and a switch control unit configured to receive the second direct current voltage from the voltage conversion unit, and use the second direct current voltage as a power supply voltage of the switch control unit, wherein when the first direct current voltage is lower than a working voltage of the switch control unit, the voltage conversion unit is configured to boost the first direct current voltage, to obtain the second direct current voltage, and the switch control unit is configured to control making and breaking of a switch circuit in a primary-side circuit of the power adapter, and to control turning-on and turning-off of the switch circuit in the primary-side circuit of the power adapter, wherein the first direct current voltage is an output voltage of the auxiliary power supply in the power adapter, and the first direct current voltage supplied by the auxiliary power supply is in direct proportion to an output voltage of the power adapter, wherein the first direct current voltage is greater than 15 volts and less than 25 volts, wherein the voltage conversion unit further comprises a first switch circuit, an inductor, a first diode, and a first output capacitor, and wherein a first terminal of the inductor is configured to receive the first direct current voltage, a second terminal of the inductor, an anode of the first diode, and a first terminal of the first switch circuit are connected, a cathode of the first diode is connected to a positive electrode of the first output capacitor, and a negative electrode of the first output capacitor and a second terminal of the first switch circuit are grounded, wherein the voltage conversion unit further comprises a boost control unit or a boost/buck control unit, the boost control unit or the boost/buck control unit is configured to detect the first direct current voltage and control making and breaking of the first switch circuit;

wherein the first switch circuit, the inductor and the first diode works to boost the first direct current voltage to obtain the second direct current voltage when the first direct current voltage is lower than the working voltage of the switch control unit, and the first switch circuit stays in a cut-off state to buck the first direct current voltage or directly supply the first direct current voltage to the switch control unit when the first direct current voltage is higher than the working voltage of the switch control unit, wherein the switch control unit is further configured to receive the first direct current voltage directly for detection, and control turning-on and turning-off of the boost control unit or the boost/buck control unit based on a detection result of the first direct current voltage.

8. The power adapter according to claim 7, wherein the auxiliary power supply comprises an auxiliary winding, a second output capacitor, a resistor, and a third diode, wherein a first terminal of the auxiliary winding is connected to an anode of the third diode, a cathode of the third diode is connected to a first terminal of the resistor, a second terminal of the resistor is connected to a positive electrode of the second output capacitor, a negative electrode of the second output capacitor is connected to a second terminal of the auxiliary winding, and the second terminal of the auxiliary winding and the negative electrode of the second output capacitor are grounded.

9. The power adapter according to claim 7, wherein the voltage conversion unit comprises the boost control unit and when the first direct current voltage is lower than the working voltage of the switch control unit, the boost control unit is configured to control making and breaking of the first switch circuit, to boost the first direct current voltage.

10. The power adapter according to claim 7, wherein the voltage conversion unit comprises the boost/buck control unit, and a second switch circuit, wherein
when the first direct current voltage is lower than the working voltage of the switch control unit, the boost/buck control unit is configured to control making and breaking of the first switch circuit, to boost the first direct current voltage; and
when the first direct current voltage is higher than the working voltage of the switch control unit, the boost/buck control unit is further configured to control making and breaking of the second switch circuit, to buck the first direct current voltage.

11. The power adapter according to claim 10, wherein the voltage conversion unit further comprises a second diode, and wherein
a first terminal of the second switch circuit is configured to receive the first direct current voltage, a second terminal of the second switch circuit, a first terminal of the inductor, and a cathode of the second diode are connected, a second terminal of the inductor, a first terminal of the first switch circuit, and an anode of the first diode are connected, a cathode of the first diode is connected to an anode of the first output capacitor, and an anode of the second diode, a negative electrode of the first output capacitor, and a second terminal of the first switch circuit are grounded; and
when the voltage conversion unit boosts the first direct current voltage, the boost/buck control unit is further configured to control the second switch circuit to be in a conducted state; or
when the voltage conversion unit bucks the first direct current voltage, the boost/buck control unit is further configured to control the second switch circuit to be in a cut-off state.

12. The power adapter according to claim 7, wherein the first direct current voltage directly supplies power to a low-voltage side of the switch control unit to power the switch control unit.

13. The power adapter according to claim 7, wherein the inductor, the first diode, and the first output capacitor are integrated into a same integrated chip as the control circuit.

* * * * *